United States Patent
Nikazm et al.

(10) Patent No.: US 10,733,134 B2
(45) Date of Patent: Aug. 4, 2020

(54) SYSTEMS AND METHODS FOR ENABLING UNIVERSAL CIRCUIT BOARD SOCKET

(71) Applicant: Dell Products L.P., Round Rock, TX (US)

(72) Inventors: Ayedin Nikazm, Austin, TX (US); Ramesh Radhakrishnan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/117,559

(22) Filed: Aug. 30, 2018

(65) Prior Publication Data
US 2020/0073844 A1    Mar. 5, 2020

(51) Int. Cl.
| | |
|---|---|
| *G06F 13/00* | (2006.01) |
| *G06F 13/38* | (2006.01) |
| *G06F 13/40* | (2006.01) |
| *G06F 13/42* | (2006.01) |
| *G06F 15/78* | (2006.01) |

(52) U.S. Cl.
CPC .......... *G06F 13/42* (2013.01); *G06F 15/7807* (2013.01)

(58) Field of Classification Search
CPC ........... G06F 13/00; G06F 13/38; G06F 13/40
See application file for complete search history.

(56) References Cited

U.S. PATENT DOCUMENTS

| | | | | |
|---|---|---|---|---|
| 5,675,772 A | * | 10/1997 | Liu | G06F 9/3879 703/27 |
| 5,678,011 A | * | 10/1997 | Kim | G06F 1/184 361/748 |
| 5,918,023 A | * | 6/1999 | Reeves | G06F 13/4068 710/100 |
| 5,983,297 A | * | 11/1999 | Noble | G06F 13/4068 710/312 |
| 6,223,147 B1 | * | 4/2001 | Bowers | G11C 5/00 703/21 |
| 6,421,783 B1 | * | 7/2002 | Liu | H05K 1/141 361/790 |
| 6,732,266 B1 | * | 5/2004 | Anderson | H05K 1/029 710/12 |

(Continued)

FOREIGN PATENT DOCUMENTS

GB        2424496 A  *  9/2006  .......... G06F 13/409

*Primary Examiner* — David E Martinez
(74) *Attorney, Agent, or Firm* — Jackson Walker L.L.P.

(57) ABSTRACT

In accordance with embodiments of the present disclosure, an information handling system may include a motherboard, a plurality of information handling resources communicatively coupled to the motherboard, a socket communicatively coupled to the motherboard and configured to receive one of a plurality of different types of interposers, wherein each of the plurality of interposers is configured to provide routing of electrical signals between the socket and a respective system on a chip communicatively coupled to such interposer, and a configuration module. The configuration module may be configured to receive identifying information associated with an interposer, of the plurality of interposers, communicatively coupled to the socket and based on the identifying information, configure the plurality of information handling resources for interoperability with a system on a chip communicatively coupled to the interposer.

14 Claims, 2 Drawing Sheets

(56) References Cited

U.S. PATENT DOCUMENTS

| | | | | |
|---|---|---|---|---|
| 2001/0018721 A1* | 8/2001 | McKenna | ............. | G06F 13/409 |
| | | | | 710/305 |
| 2005/0243531 A1* | 11/2005 | Kulpa | .................. | H05K 7/1092 |
| | | | | 361/783 |
| 2006/0171131 A1* | 8/2006 | Chen | ...................... | H05K 1/141 |
| | | | | 361/783 |
| 2012/0262862 A1* | 10/2012 | Johnson | .................... | G06F 1/32 |
| | | | | 361/679.02 |
| 2015/0079815 A1* | 3/2015 | Leigh | ................. | H01R 12/7076 |
| | | | | 439/74 |

* cited by examiner

SYSTEMS AND METHODS FOR ENABLING UNIVERSAL CIRCUIT BOARD SOCKET

TECHNICAL FIELD

The present disclosure relates in general to information handling systems, and more particularly to methods and systems for enabling use of a universal information handling system motherboard and socket.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Numerous central processing unit (CPU) vendors offer numerous and different types of systems on a chip (SOCs). The features, utility, and costs of various SOCs are different, and a desired SOC is often selected based on desired features while maintaining a low cost. However, using traditional approaches, enabling the use of different SOCs typically requires an information handling system motherboard and socket for each different type of SOC, which can add further cost and design complexity to an information handling system.

SUMMARY

In accordance with the teachings of the present disclosure, the disadvantages and problems associated with existing approaches to supporting different systems on a chip in an information handling system may be reduced or eliminated.

In accordance with embodiments of the present disclosure, an information handling system may include a motherboard, a plurality of information handling resources communicatively coupled to the motherboard, a socket communicatively coupled to the motherboard and configured to receive one of a plurality of different types of interposers, wherein each of the plurality of interposers is configured to provide routing of electrical signals between the socket and a respective system on a chip communicatively coupled to such interposer, and a configuration module. The configuration module may be configured to receive identifying information associated with an interposer, of the plurality of interposers, communicatively coupled to the socket and based on the identifying information, configure the plurality of information handling resources for interoperability with a system on a chip communicatively coupled to the interposer.

In accordance with these and other embodiments of the present disclosure, a method may include, in an information handling system having a motherboard, a plurality of information handling resources communicatively coupled to the motherboard, and a socket communicatively coupled to the motherboard and configured to receive one of a plurality of different types of interposers, wherein each of the plurality of interposers is configured to provide routing of electrical signals between the socket and a respective system on a chip communicatively coupled to such interposer, receiving identifying information associated with an interposer, of the plurality of interposers, communicatively coupled to the socket and based on the identifying information, configuring the plurality of information handling resources for interoperability with a system on a chip communicatively coupled to the interposer.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system having a motherboard, a plurality of information handling resources communicatively coupled to the motherboard, and a socket communicatively coupled to the motherboard and configured to receive one of a plurality of different types of interposers, wherein each of the plurality of interposers is configured to provide routing of electrical signals between the socket and a respective system on a chip communicatively coupled to such interposer: receive identifying information associated with an interposer, of the plurality of interposers, communicatively coupled to the socket; and based on the identifying information, configure the plurality of information handling resources for interoperability with a system on a chip communicatively coupled to the interposer.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
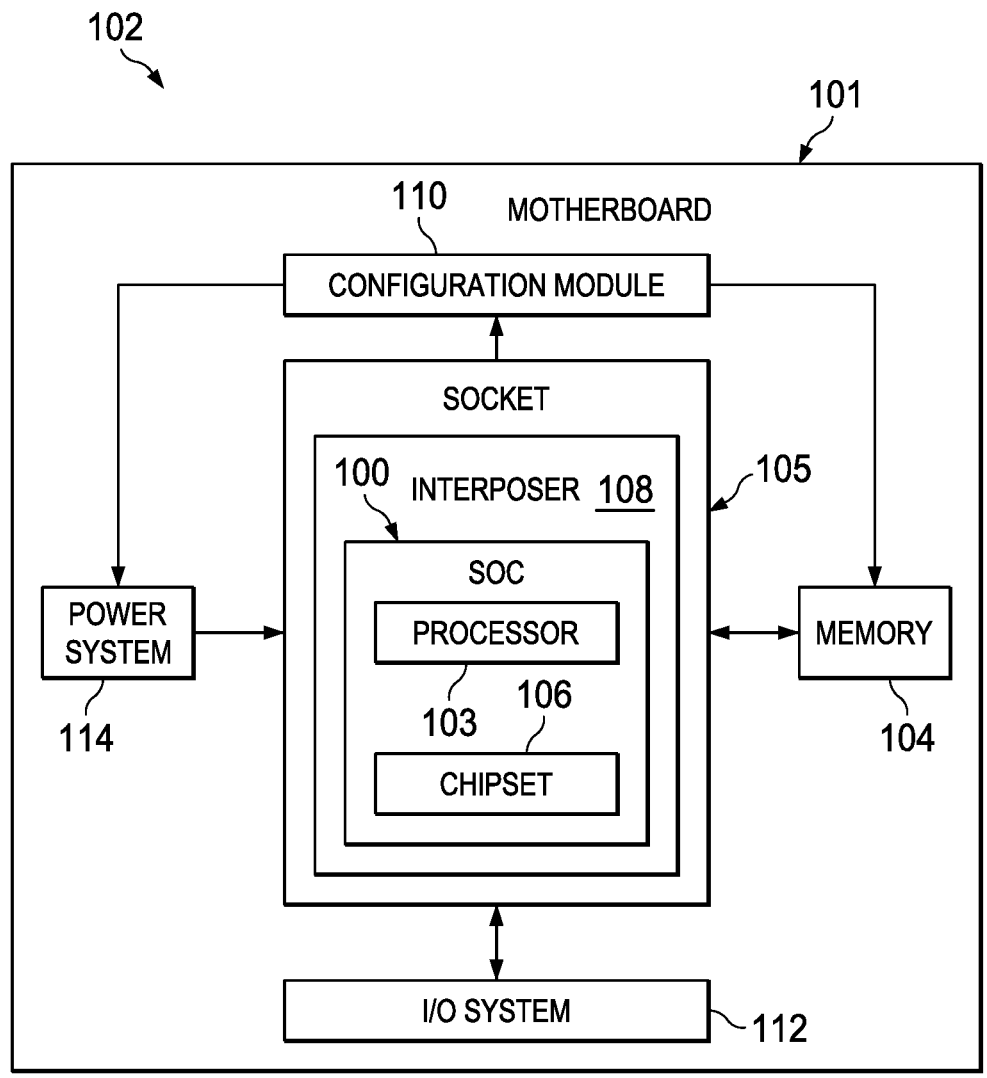
FIG. 1 illustrates a block diagram of an example information handling system, in accordance with embodiments of the present disclosure.
Figure 2:
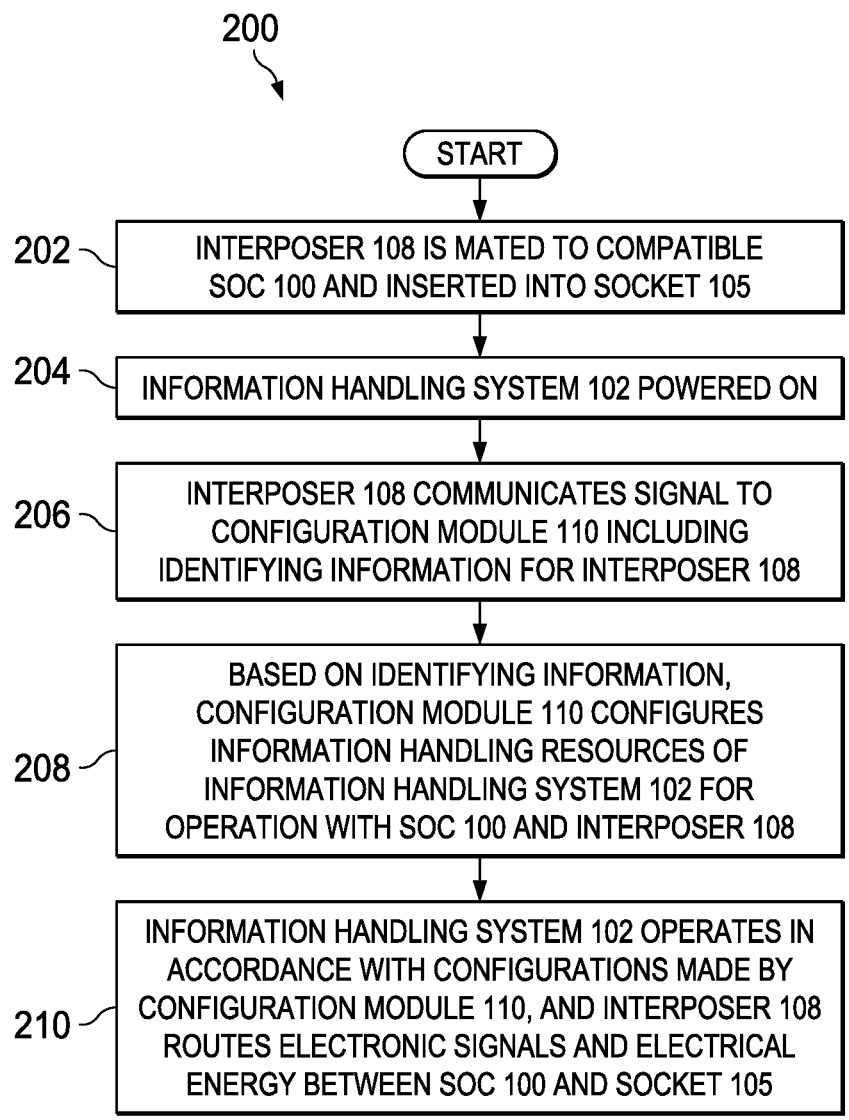
FIG. 2 illustrates a flow chart of an example method for enabling a universal circuit board socket, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101. Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a socket 105, a memory 104, an input/output (I/O) system 112, a power system 114, and a configuration module 110.

Socket 105 may comprise any suitable system, device, or apparatus for electrically and mechanically mating a system on a chip (SOC) specific interposer 108 to motherboard 101, and may comprise a plurality of interfaces for interacting with other components of motherboard 101 and information handling system 102. For example, socket 105 may include a memory interface for communicating signals to and from memory 104, an I/O interface for communicating signals to and from I/O system 112, a configuration module interface for communicating signals to configuration module 110 (as described in greater detail below), and a power system interface for receiving electrical energy for powering an SOC 100 and interposer 108 disposed in socket 105 (as also described in greater detail below). In practice, socket 105 may be a universal socket, in that it is configured as a universal interface between information handling resources coupled to socket 105 and a plurality of different types of interposers 108 that may be inserted into socket 105, as described in greater detail below.

Memory 104 may be communicatively coupled to socket 105 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

I/O system 112 may comprise any suitable collection of I/O devices that may communicate with an SOC 100 disposed in socket 105. For example, I/O system 112 may include, without limitation, input devices such as a keyboard or mouse, output devices such as display monitors and printers, input/output devices such as network interfaces and storage devices, and/or appropriate interfaces for communicating with such devices.

Configuration module 110 may comprise any suitable system, device, or apparatus configured to receive a signal from an interposer 108 via socket 105 including identifying information associated with interposer 108 and based on such identifying information, configure one or more components of information handling system 102 for operation with interposer 108 and an SOC 100 coupled thereto, as described in greater detail below. Examples of devices that may implement configuration module 110 include a microcontroller, a complex programmable logic device, a field-programmable gate array, an application specific integrated circuit, or any other suitable device.

Generally speaking, power system 114 may include any system, device, or apparatus configured to supply electrical current to one or more information handling resources of information handling system 102. Accordingly, power system 114 may include one or more power supply units, one or more voltage regulators, and/or other components. In some embodiments, power system 114 may include one or more programmable components (e.g., a programmable voltage regulator).

Together, socket 105, memory 104, I/O system 112, configuration module 110, and power system 114 may provide a universal motherboard and information handling system architecture that may be utilized by various different types of interposers and SOCs, as described in greater detail below.

Interposer 108 may comprise any suitable system, device, and apparatus configured to serve as an interface between an SOC 100 coupled to interposer 108 and socket 105 into which interposer 108 is inserted. Thus, interposer 108 may include a plurality of electrical conductive pathways for routing electrical connectors (e.g., pins, pads, etc.) of SOC 100 to respective counterpart electrical connectors of socket 105, such that SOC 100 can properly communicate with other components of information handling system 102. In addition, interposer 108 may include a memory (e.g., a read-only memory) that sets forth identifying information regarding interposer 108 (e.g., manufacturer, model number, interposer type, version, etc.) such that when interposer 108 is inserted into socket 105 and receives power from power system 114, interposer 108 communicates (either automatically or in response to a request from configuration module 110) a signal to configuration module 110 indicative of such identifying information, such that configuration module 110 may use such information to configure information handling resources of information handling system 102 for operation with interposer 108 and SOC 100 coupled thereto.

As mentioned above, interposer 108 may be configured to receive an SOC 100 and communicatively couple such SOC 100 to socket 105 for communication and interaction with other components of information handling system 102. An SOC 100 may comprise an integrated circuit that integrates multiple components of an information handling system into a single integrated circuit package. For example, as shown in FIG. 1, an SOC 100 may include a processor 103 and a chipset 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory (e.g., memory 104) and/or another component of information handling system 102.

Chipset 106 may include any system, device, or apparatus configured to control certain data paths (e.g., data flow between processor 103 and other components of information handling system 102) and/or interactions of components of information handling system 102. Thus, a chipset 106 may include a set of specialized chips for allowing communication between various components of information handling system 102. For example, a chipset 106 may include northbridge and southbridge chips linking processor 103 for I/O communication with other components or peripherals of information handling system 102, e.g., memory 104, I/O system 112, power system 114, and/or other information handling resources of information handling system 102.

As mentioned above, configuration module 110 may configure information handling resources of information handling system 102 based on identifying information associated with interposer 108. Such identifying information may in some instances be indicative of functionality of an SOC 100 coupled to an interposer and/or the features and/or components of information handling system 102 that may be supported by such SOC 100. Thus, responsive to receiving a signal from interposer 108 (e.g., via socket 105) including identifying information regarding interposer 108, configuration module 110 may use such identifying information as in index to a map, list, table, database, or other data structure correlating identifying information to configuration settings, and then apply such configuration settings based on the identifying information. Examples of such configuration settings may include settings of power system 114 (e.g., voltage sequencing, levels of voltage rails, power requirements), an identification of firmware to be loaded and executed from memory 104, setting of frequencies of system clocks, disabling of individual information handling resources not supported by the installed SOC 100, etc.

Although FIG. 1 depicts information handling system 102 having various components, information handling system 102 may have one or more components other than those depicted in FIG. 1. In addition, although FIG. 1 depicts the various components being on motherboard 101, in some embodiments, all or a portion of one or more components of motherboard 101 may be external to motherboard 101. For example, in some embodiments, a portion of power system 114 may be external to motherboard 101 (e.g., one or more power supply units external to motherboard 101) while another portion of power system 114 may be internal to motherboard 101 (e.g., one or more voltage regulators disposed on motherboard 101).

FIG. 2 illustrates a flow chart of an example method 200 for enabling a universal circuit board socket, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, an interposer 108 may be mated to a compatible SOC 100 and inserted into socket 105. At step 204, information handling system 102 may be powered on or otherwise initialized. At step 206, interposer 108 may communicate a signal to configuration module 110 including identifying information for interposer 108. At step 208, based on the identifying information, configuration module 110 may configure information handling resources of information handling system 102 for operation with SOC 100 and interposer 108. At step 210, information handling system 102 may operate in accordance with the configurations made by configuration module 110, and interposer 108 may route electronic signals and electrical energy between the proprietary pinout of SOC 100 and SOC-agnostic pinout of socket 105 and motherboard 101.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a motherboard;
a plurality of information handling resources communicatively coupled to the motherboard;
a socket communicatively coupled to the motherboard and configured to receive one of a plurality of different types of interposers, wherein each of the plurality of interposers corresponds to a particular system on a chip (SOC) of a plurality of SOCs and is configured to provide routing of electrical signals between the socket and the particular SOC communicatively coupled to such interposer; and
a configuration module configured to:
 receive identifying information associated with an interposer of the plurality of interposers, the interposer being communicatively coupled to the socket; and
 based on the identifying information, configure the plurality of information handling resources for interoperability with the particular SOC communicatively coupled to the interposer, wherein the configuring the plurality of information handling resources includes configuring a power system of the information handling system including a programmable voltage regulator for interoperability with the particular SOC; and
 wherein the configuring the plurality of information handling resources further includes determining that at least one information handling resource is not supported by the particular SOC, and disabling the at least one information handling resource.

2. The information handling system of claim 1, wherein the configuration module is configured to receive the identifying information from the interposer via the socket.

3. The information handling system of claim 1, wherein configuring the plurality of information handling resources comprises identifying firmware to be executed on the information handling system for interoperability with the particular SOC.

4. An interposer comprising:
a plurality of electrical conductive pathways for routing electrical connectors of a system on a chip (SOC) communicatively coupled to the interposer to respective counterpart electrical connectors of a circuit board socket to which the interposer is inserted; and
a non-transitory computer-readable medium configured to store identifying information associated with the interposer;
wherein the interposer is configured to communicate the identifying information to a configuration module communicatively coupled to the circuit board socket, such that the configuration module configures information handling resources communicatively coupled to the circuit board socket for interoperability with the SOC based on the identifying information, wherein the configuring the information handling resources includes configuring a power system including a programmable voltage regulator for interoperability with the SOC; and
wherein the configuring the information handling resources further includes determining that at least one information handling resource is not supported by the SOC, and disabling the at least one information handling resource.

5. A method comprising, in an information handling system having a motherboard, a plurality of information handling resources communicatively coupled to the motherboard, and a socket communicatively coupled to the motherboard and configured to receive one of a plurality of different types of interposers, wherein each of the plurality of interposers corresponds to a particular system on a chip (SOC) of a plurality of SOCs and is configured to provide routing of electrical signals between the socket and the particular SOC communicatively coupled to such interposer:
receiving identifying information associated with an interposer of the plurality of interposers, the interposer being communicatively coupled to the socket; and
based on the identifying information, configuring the plurality of information handling resources for interoperability with the particular SOC communicatively coupled to the interposer, wherein the configuring the plurality of information handling resources includes configuring a power system of the information handling system including a programmable voltage regulator for interoperability with the particular SOC; and
wherein the configuring the plurality of information handling resources further includes determining that at least one information handling resource is not supported by the particular SOC, and disabling the at least one information handling resource.

6. The method of claim 5, further comprising receiving the identifying information from the interposer via the socket.

7. The method of claim 5, wherein configuring the plurality of information handling resources comprises identifying firmware to be executed on the information handling system for interoperability with the particular SOC.

8. The method of claim 5, wherein the particular SOC includes a chipset comprising a northbridge and a southbridge.

9. An article of manufacture comprising:

a non-transitory computer-readable medium; and computer-executable instructions carried on the computer-readable medium, the instructions readable by a processor, the instructions, when read and executed, for causing the processor to, in an information handling system having a motherboard, a plurality of information handling resources communicatively coupled to the motherboard, and a socket communicatively coupled to the motherboard and configured to receive one of a plurality of different types of interposers, wherein each of the plurality of interposers corresponds to a particular system on a chip (SOC) of a plurality of SOCs is configured to provide routing of electrical signals between the socket and the particular SOC communicatively coupled to such interposer:

receive identifying information associated with an interposer of the plurality of interposers, the interposer being communicatively coupled to the socket; and based on the identifying information, configure the plurality of information handling resources for interoperability with the particular SOC communicatively coupled to the interposer, wherein the configuring the plurality of information handling resources includes configuring a power system of the information handling system including a programmable voltage regulator for interoperability with the particular SOC; and wherein the configuring the plurality of information handling resources further includes determining that at least one information handling resource is not supported by the particular SOC, and disabling the at least one information handling resource.

10. The article of claim 9, wherein the instructions are further executable for receiving the identifying information from the interposer via the socket.

11. The article of claim 9, wherein configuring the plurality of information handling resources comprises identifying firmware to be executed on the information handling system for interoperability with the particular SOC.

12. The article of claim 9, wherein the particular SOC includes a chipset comprising a northbridge and a southbridge.

13. The information handling system of claim 1, wherein the particular SOC includes a chipset comprising a northbridge and a southbridge.

14. The interposer of claim 4, wherein the SOC includes a chipset comprising a northbridge and a southbridge.

* * * * *